United States Patent
Varadhan et al.

(10) Patent No.: US 7,515,982 B2
(45) Date of Patent: Apr. 7, 2009

(54) COMBINING AUTOMATED AND MANUAL INFORMATION IN A CENTRALIZED SYSTEM FOR SEMICONDUCTOR PROCESS CONTROL

(75) Inventors: Aishwarya Varadhan, Portland, OR (US); Murali Krishna, Phoenix, AZ (US); Bo Li, Portland, OR (US); Johnny Hsiang Wu, Portland, OR (US); Chandra Mouli, Portland, OR (US); Ross A. Giddings, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 265 days.

(21) Appl. No.: 11/480,076

(22) Filed: Jun. 30, 2006

(65) Prior Publication Data

US 2008/0004739 A1 Jan. 3, 2008

(51) Int. Cl.
*G06F 19/00* (2006.01)
(52) U.S. Cl. .................................................... 700/100
(58) Field of Classification Search .................. 700/28, 700/32, 99–101, 117–121; 705/7–9
See application file for complete search history.

(56) References Cited

U.S. PATENT DOCUMENTS

| | | | | |
|---|---|---|---|---|
| 6,438,441 B1* | 8/2002 | Jang et al. | ............. | 700/121 |
| 6,470,231 B1* | 10/2002 | Yang et al. | ............. | 700/121 |
| 6,707,905 B2* | 3/2004 | Lenard | ............. | 379/266.01 |
| 6,748,282 B2* | 6/2004 | Lin | ............. | 700/95 |
| 6,968,248 B1* | 11/2005 | Mata et al. | ............. | 700/99 |
| 6,985,794 B1* | 1/2006 | Conboy et al. | ............. | 700/214 |
| 6,990,458 B2* | 1/2006 | Harrison et al. | ............. | 705/8 |
| 7,039,482 B2* | 5/2006 | Hsu et al. | ............. | 700/99 |
| 7,076,326 B2 | 7/2006 | Wu et al. | ............. | 700/213 |
| 7,117,160 B1* | 10/2006 | Haynes et al. | ............. | 705/8 |
| 2003/0225474 A1* | 12/2003 | Mata et al. | ............. | 700/121 |
| 2004/0267641 A1* | 12/2004 | Chang et al. | ............. | 705/28 |
| 2005/0094772 A1* | 5/2005 | Harrison et al. | ............. | 379/9.03 |
| 2005/0197848 A1* | 9/2005 | Chou et al. | ............. | 705/1 |

OTHER PUBLICATIONS

U.S. Appl. No. 11/315,832, filed Dec. 21, 2005, entitled "Method And Apparatus For Automated Processing By Upfront Specification Of Process Parameters" by Johnny Wu, Murali Krishna, Bo Li, and Aishwarya Varadhan.

U.S. Appl. No. 11/395,661, filed Mar. 31, 2006, entitled "Automated, Modular Approach To Assigning Semiconductor Lots To Tools" by Murali Krishna, Yi Deng, Aishwarya Varadhan, Joseph J. Concelman, Zachary T. Henkel, and Robert A. Madson.

* cited by examiner

*Primary Examiner*—M. N. Von Buhr
(74) *Attorney, Agent, or Firm*—Trop, Pruner & Hu, P.C.

(57) ABSTRACT

In one embodiment, the present invention includes a method for receiving entries in a database, each corresponding to a semiconductor lot to be processed, automatically assigning each of the entries to a process tool, and dynamically dispatching the semiconductor lot corresponding to an assigned entry to the corresponding assigned process tool based on status information of the assigned process tool. Other embodiments are described and claimed.

13 Claims, 4 Drawing Sheets

COMBINING AUTOMATED AND MANUAL INFORMATION IN A CENTRALIZED SYSTEM FOR SEMICONDUCTOR PROCESS CONTROL

BACKGROUND

Embodiments of the present invention relate to control of wafers throughout various semiconductor manufacturing processes.

Semiconductor devices are formed by performing many different manufacturing steps on wafers that are processed together in a group commonly referred to as a lot. Lots travel throughout various process tools of a semiconductor manufacturing facility to enable the different processes to be performed. Typically, there is significant human involvement in moving the lots between tools and selecting appropriate tools on which to process the lots. As a result, labor costs are high, and throughput times to obtain completed semiconductor wafers are high.

Accordingly, automated handling systems have been introduced to allow lots to travel between different process tools via an automated system. Furthermore, systems exist to automatically schedule lots to given tools. Many tools and processes still, however, are controlled manually. Current systems cannot readily accept manual input, such as needed to perform special processing on a given lot, perform preventive maintenance or the like. Furthermore, typically a set of similar semiconductor tools are managed using a single user interface, which allows for both data viewing (e.g., of assignments of lots to tools) and transaction processing (e.g., manual inputs to enter lots and assign them to tools). Because it likely that the set of tools are at different levels of functioning, when manual inputs are needed, the set of tools are downgraded to a lower (e.g., manual) mode of operation, defeating the benefit of automated operation. Thus it is difficult to integrate automated and manual handling of different lots within a single semiconductor processing line.

DETAILED DESCRIPTION

In various embodiments, a system is provided to seamlessly switch between manual and automated semiconductor material process job queue collection mechanisms. In this way, manual input of material by a human operator may be performed while the system remains in a fully automated mode. Thus, there is no need to downgrade to a manual mode of operation to receive such inputs. Furthermore, in various embodiments such a system may be centralized to enable fully automated control of semiconductor processing of lots across a wide variety of tools in a semiconductor manufacturing facility (fab). Accordingly, the centralized system may receive inputs from local (i.e., station) tool controllers, as well as other automated systems such as an automated material handling system and an automated scheduler, along with manual input from an operator. Such human intervention may be desired to override decisions of the automated system or to respond and recover from anomalous conditions. A common tool process job queue may exist to integrate job queues for both manual and automated material selection. Furthermore, a conflict management system may be present to support co-existence between human lot selection and automated selection. Owing to the centralized nature of the system, improved tool allocation and lot handling may be effected, reducing tool idle times and reducing manufacturing cycles for semiconductor material. More so, improved throughput and the automated nature of the system enables a reduction in the amount of labor costs incurred in production of semiconductor devices.

Figure 1:
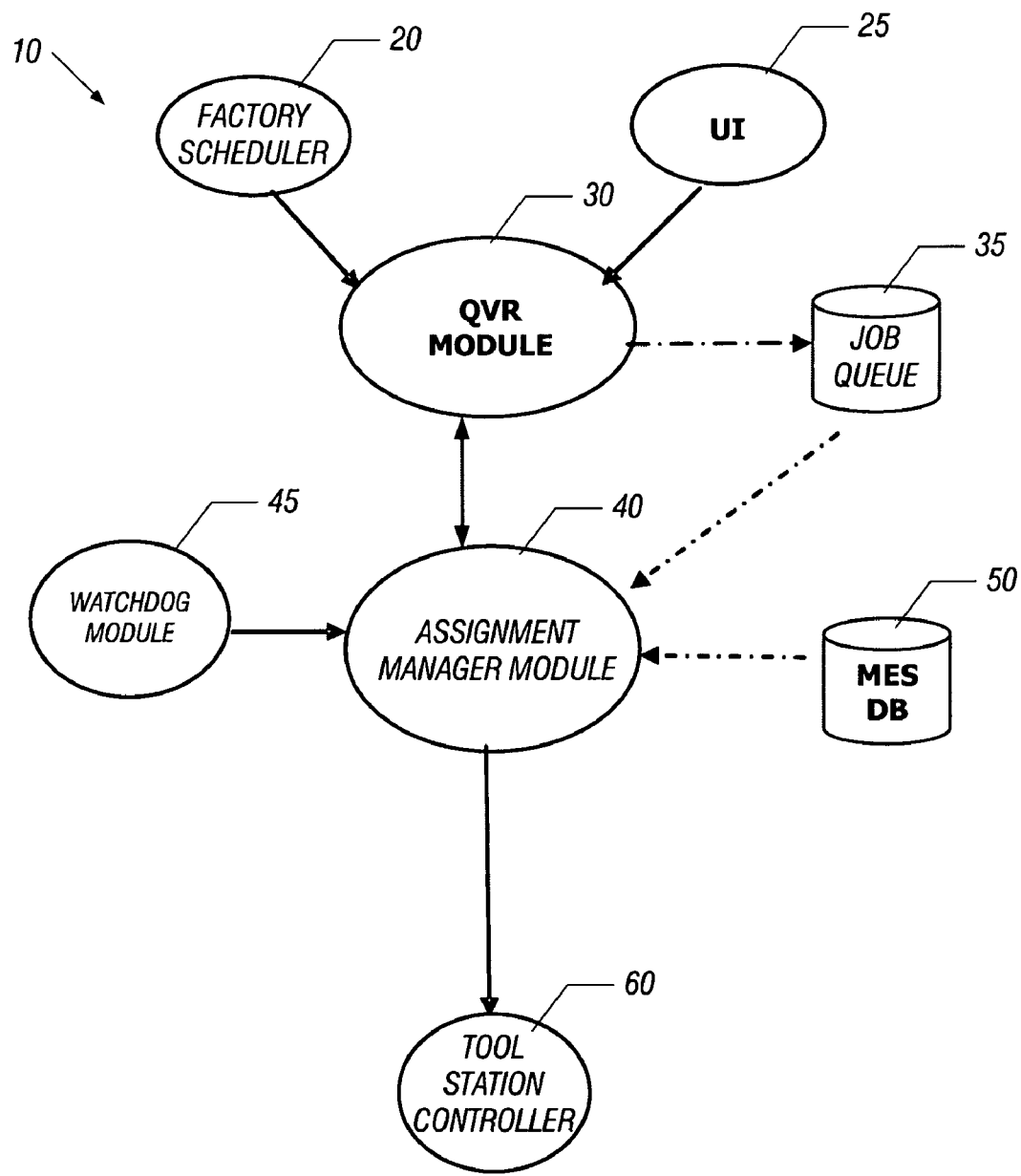
FIG. 1 is a block diagram of a system in accordance with one embodiment of the present invention.

Referring now to FIG. 1, shown is a block diagram of a system in accordance with one embodiment of the present invention. As shown in FIG. 1, system 10 may be a centralized system that can automatically receive inputs regarding semiconductor material along with status information from various tools of the fab. As used herein, the term "semiconductor material" may be used interchangeably with terms "semiconductor lot" or "lot", all of which refer to a collection of multiple semiconductor wafers grouped together for processing and transport. In some embodiments, such lots may correspond to groups of up to 25 wafers to be transported in a boat or other wafer supporting device. Note that multiple lots may be collected into a batch, which is a collection of two or more lots into a logical grouping.

Still referring to FIG. 1, system 10 includes a queue validation and redistribution (QVR) module 30 that is coupled to receive inputs regarding various semiconductor lots. Specifically, as shown in FIG. 1 QVR module 30 is coupled to receive automated queue input information from a factory scheduler 20, which may be software or other control logic that performs scheduling functions with respect to incoming semiconductor lots. In various embodiments, factory scheduler 20 may prioritize and collect lots in the form of automated job queue information upon receipt of status information when a given lot has completed processing on a previous process tool. Furthermore, QVR module 30 is coupled to receive manual queue input information via a user interface 25. In various embodiments, user interface 25 may be an interface of a personal computer (PC) such as a server system or other system on which a user (i.e., a human operator) can input manual information regarding semiconductor lots. A human operator may have the ability to reserve lots for a specific tool (e.g., via addition to manual job queue information). Such input via user interface 25 provides flexibility to override system selection of tool assignment recommendations and further influences automated assignments based on user input, providing for given operational needs. Furthermore, user interface 25 provides a single interface through which human intervention and an automated system may co-exist. That is, user interface 25 may be a unified interface in which tools that are unattended and tools that implement manual intervention can be commonly supported. In this way, there is no need to downgrade tools to a lower mode of operation when manually executing tasks on other tools.

In various embodiments, QVR module 30 may perform a process tool selection and assignment of material to a specific process tool. That is, based on incoming information, namely lots available for automated assignment from either factory scheduler 20 or user interface 25, QVR module 30 may perform an optimal assignment of lots to specific process tools for lots and provide the assignments to a job queue 35. Note that while shown as a single database in the embodiment of FIG. 1, in various implementations job queue 35 may logically (and/or physically) include different databases for automated and manual job queue information. QVR module 30 may perform automated and optimal assignment of a single material or batch of materials to relevant process tools via addition to this logical tool queue. In various embodiments, configurable objectives may be optimized, such as process tool usage, time to process material, sequence of material processing and material buffering, although the scope of the present invention is not limited in this regard.

Referring still to FIG. 1, an assignment manager module 40 is coupled to QVR module 30. Furthermore, assignment manager module 40 is coupled to job queue 35, to a watchdog module 45, and to a manufacturing execution system (MES) database 50. Furthermore, assignment manager module 40 may be coupled to multiple tool station controllers 60, each of which may provide status information regarding a given status of its associated process tool. Based on inputs received from QVR module 30 and the information in job queue 35, assignment manager module 40 may dynamically dispatch lots to their assigned tools based on tool/lot status and their operational models, e.g., MES models or the like. Assignment manager module 40 thus enables the actual dispatch of a given lot to its assigned tool, e.g., via instructions to an automated wafer handling system to enable transport of the lot from its current location (e.g., a stocker or storage device) to the selected tool for processing (and its later return). Via the centralized system, in many instances material may be provided directly from a first process tool to a second process tool, avoiding the need for interim storage, improving throughput.

Note that assignment manager module 40 may dynamically customize tool job queue process tool controls and dispatch lots to tools based on real-time tool/material status changes. By centralizing this function, a job dispatching optimization algorithm may dynamically adjust the job load and lot process priority based on the tool/material status and distribution changes across a set of tools. Real-time and automated detection of process tool availability may be performed by assignment manager module 40 and based on this information tool job queue dispatching sequencing and timing may be customized based on optimized operational models for various modules. In various embodiments, assignment manager module 40 may centralize an optimized material dispatching policy and interface with the tool/material to intercept status changes and make optimum, real-time decisions.

In the embodiment of FIG. 1, watchdog module 45 may act as a sweeper process that periodically scans system 10 to determine whether one or more lots that do not have pending process tool assignments exist or whether lots could benefit from reassignment. If such lots are identified, watchdog module 45 may call on QVR module 30 to assign the lots to available process tools, as described above.

When a given lot completes processing on its assigned tool, system 10 receives an indication of the availability of the lot for processing at a subsequent processing step (and the potential availability of the process tool for handling a new lot). Accordingly, by way of factory scheduler 20 or user interface 25, QVR module 30 may schedule a lot for a next process.

Figure 2:
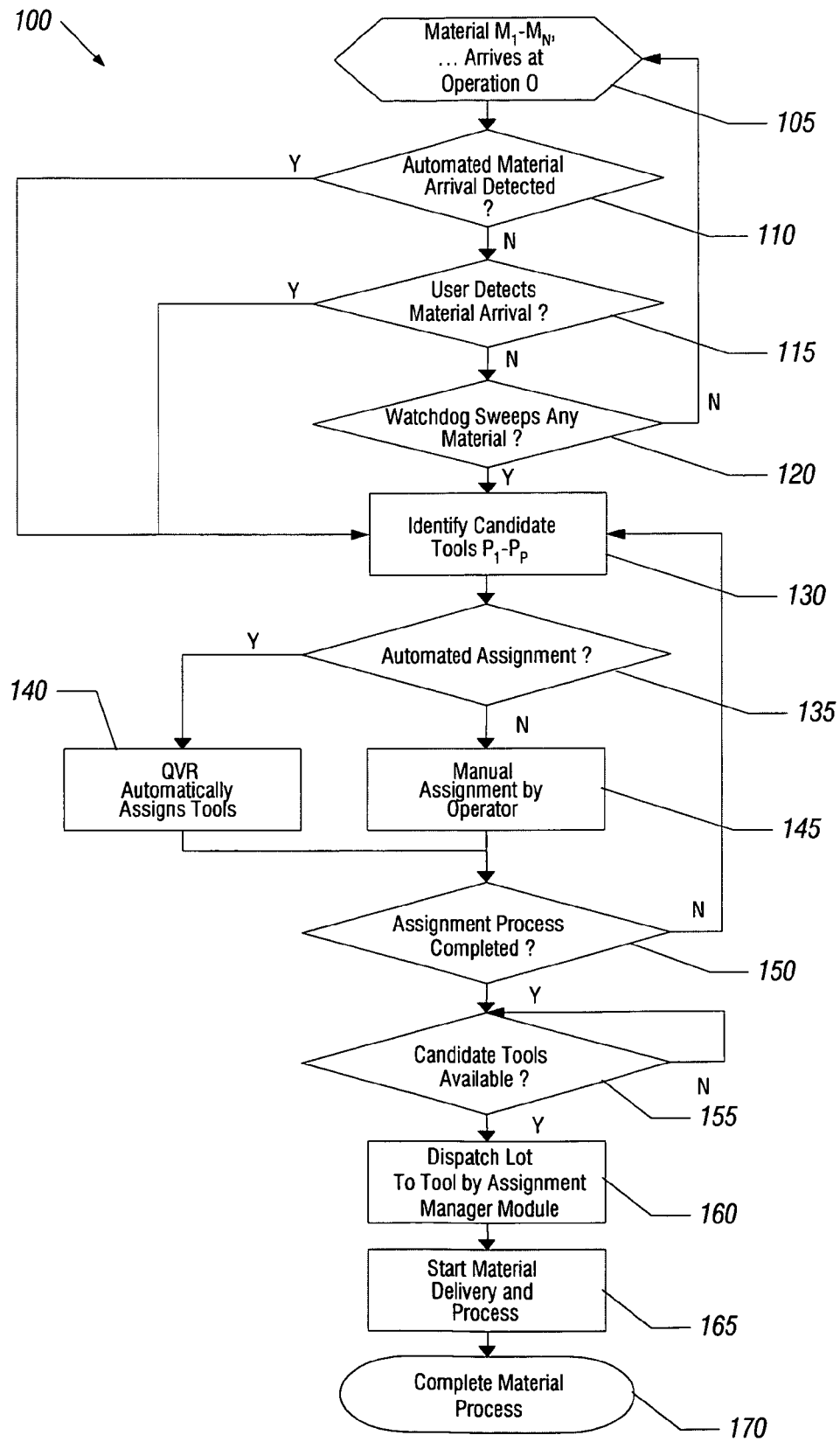
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may begin by receiving various semiconductor material, e.g., lots $M_1$-$M_N$, in a system in accordance with an embodiment of the present invention. Such material may arrive in the system after execution of a given operation O, or upon initial introduction into a fab. Control then passes from block 105 to diamond 110. There, it may be determined whether automated material arrival in the system has been detected. For example, a factory scheduler or other module may provide status information regarding a given semiconductor lot. The status information may include information regarding the lot's location, as well as its processing status, among other such information. If automated material arrival has been detected, control passes to block 130.

Otherwise, control passes to diamond 115, where it may be determined whether a user has detected material arrival, e.g. via manual input, has occurred. Such manual input may be via a user interface of the system, in which a human operator provides status information regarding a lot. If such manual detection has occurred, control passes to block 130. Otherwise, control passes diamond 120, where it may be determined whether a watchdog sweep has found an unassigned lot or lot to be reassigned within the system (diamond 120). Such an unassigned lot may appear in a system when a lot that was pulled out of processing for various test operations is replaced into the system. If any detection of an unassigned lot has occurred, control passes to block 130. If not control passes back to block 105, discussed above.

Still referring to FIG. 2, at block 130 candidate tools $P_1$-$P_p$ may be identified (block 130). That is, candidate tools for handling a given operation N may be identified. For example, a given lot may require an etch process to be next performed. The candidate tools may be one or more process tools capable of performing the requested etch operation. Control then passes to diamond 135, where it may be determined whether an automated assignment is to be made. If so, control passes to block 140 where a given semiconductor lot may be automatically assigned to a logical tool queue, e.g., via a QVR module (block 140). In various embodiments, a given material $M_i$ may be automatically assigned to a process tool $P_j$ selected from a group of common process tools capable of performing the desired operation on the lot. In some embodiments, the automated assignment may thus assign a given lot to a logical tool queue in a fully automated manner. Although the scope of the present invention is not limited in this regard, the automatic assignment may be performed according to different optimization parameters to select a tool in which the lot is to be processed. The optimization may be based on various parameters, such as speed of processing in the tool, location of the tool and/or lot, among others.

Still referring to FIG. 2, if instead at diamond 135 it is determined that automated assignment is not desired, control passes to block 145. There, a given lot may be manually assigned by an operator (block 145). Such manual assignment may occur at lower levels of automation of a given system. Note, however, that such manual assignment may be performed without the need to switch the system out of automated assignment mode, reducing the time and burden to perform manual assignments. That is, there is no need to lower system state from a fully automated mode to handle this manual assignment. Such manual assignment may be performed when adjusting process parameters for a test wafer lot, for example. From either of blocks 140 and 145, control passes to diamond 150 where it may be determined whether the assignment process is completed. That is, there may be additional unassigned lots. If so, control passes back to block 130 to identify candidate tools for such unassigned lots.

Referring still to FIG. 2, if it is determined at diamond 150 that all assignment processes are completed, control passes to diamond 155. There, it may be determined whether the assigned tools are available (diamond 155). That is, the system may detect the availability of a selected process tool, e.g., via status information received from a tool station controller associated with a tool. Note that when a tool station controller provides status information to the system, the system may update an entry associated with the tool, e.g., in a tool queue. If a given tool requests a lot, a flag or other indicator to identify the tool's availability may be set in the entry. In this way, when a lot becomes available for the processing need associated with that tool, the system can automatically assign the lot to the tool, without the need for manually restarting the tool and requesting a lot if the tool has gone into an idle mode while waiting assignment. If the candidate tool is available, control passes to block 160. Otherwise, diamond 155 may loop back on itself. At block 160, a given lot may be dispatched to its assigned tool, e.g., by an assignment manager module. Thus when a given tool's status indicates its availability for receiving a new lot, this module may dynamically dispatch the material to the tool, e.g., based on tool/lot status and operational models. From block 160, control passes to block 165 where material delivery can be started to provide the material from its current location to the assigned tool.

When properly received by the assigned tool, the desired operation may be performed on the tool. In various embodiments, an automated tool wafer handling system may provide material, e.g., from a storage location to the selected tool. When the given process has been completed, control passes to block 170. At this point, method 100 may conclude with respect to this processing operation on the material. However, it is to be understood that if the material has not been completed (i.e., additional tasks are to be performed), control may pass from block 170 to block 105 for further execution of method 100 beginning again at block 105, e.g. for a next operation in the processing of the semiconductor lot. For example, after a photolithography operation, an etching or other process to define a pattern created by the photolithography process may be implemented. Of course many other processing steps may be realized. Using embodiments of the present invention, both automated and manual control of different wafer lots at different operations of a semiconductor manufacturing process may be realized. In this way, reduced time for manufacture and reduced human involvement may result, reducing costs associated with semiconductor manufacture.

Figure 3:
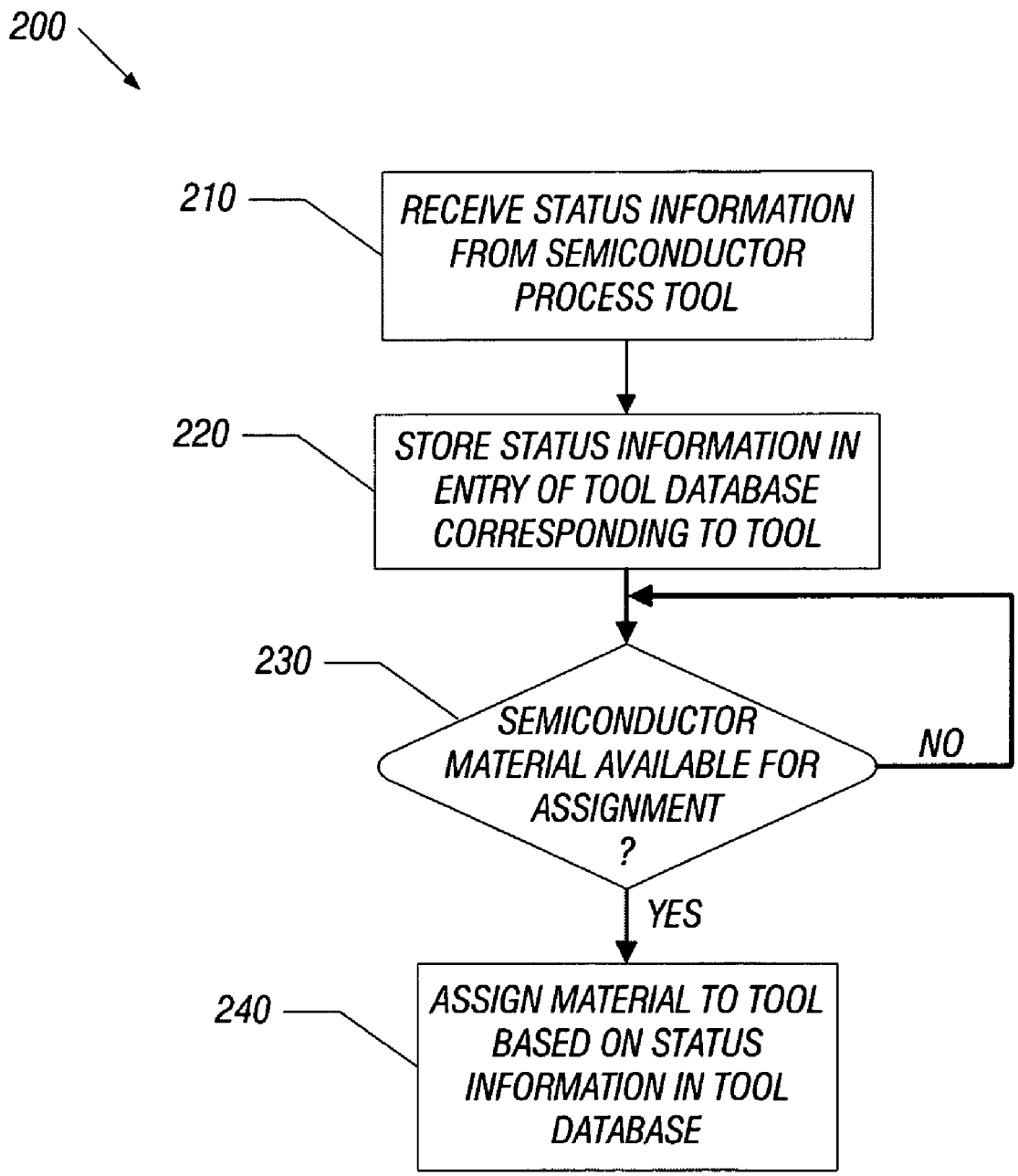
FIG. 3 is a flow diagram of a method in accordance with another embodiment of the present invention.

Referring now to FIG. 3, shown is a flow diagram of a method in accordance with one embodiment of the present invention. As shown in FIG. 3, method 200 may be used to receive status information from process tools and use the same in assigning lots to various tools. As shown in FIG. 3, method 200 may begin by receiving status information from a semiconductor process tool (block 210). For example, a process tool completing an operation on a first semiconductor lot may send a request to the centralized system to receive a new lot for processing.

Next, status information may be stored in an entry of a tool database, and more particularly in an entry corresponding to the tool (block 220). Note that in various embodiments, the tool database may be part of a MES database, or it may be a separate database. As one example, assume that a process tool is indicating its availability and requesting a lot for processing, an availability indicator portion of the entry may be set to indicate the request. Next, it may be determined whether semiconductor material is available for assignment (diamond 230). Note that in some embodiments, semiconductor material may be represented by an entry in a separate database listing semiconductor lots and information regarding operations completed and a next process to be performed.

If a semiconductor lot is available that needs the process to be performed by the given process tool, control passes to block 240. Otherwise diamond 230 loops back on itself. Note that in various embodiments, some indeterminate period of time may occur before a given process tool has semiconductor material assigned to it. Accordingly, the process tool may enter into an idle mode such as a sleep mode. However, because the tool has already indicated its availability for processing via the status information sent and stored in the tool database, there is no need for either manual restart of the semiconductor processing tool or generating an additional request for semiconductor material on restarting of the process tool.

Referring still to FIG. 3, at block 240 semiconductor material may be assigned to a tool based on status information in the tool database. For example, a lot that is to have a deposition step performed on it may be assigned to a given deposition tool. In addition to assigning material based on a valid availability indicator for the tool, additional information may be taken into account in assigning material to the tool. For example, efficiency of the tool, relative location of the lot to the tool (e.g., as compared to other available tools), among other such parameters may be considered. Furthermore, note that although shown as a single iteration in the embodiment of FIG. 3, method 200 may be performed iteratively whenever status information is received or semiconductor material is available for a given process.

By centralizing semiconductor material job control and dispatching for continuous and uninterrupted lot processing, balanced and optimized material processing sequencing may be realized that takes into consideration the real-time tool and material availability, preventative maintenance (PM) scheduling, and the like, to improve average tool utilization and avoid costly and time consuming tool maintenance activities that may be required on tools idle for extended periods. Embodiments may reduce material idle-time (time elapsed since availability of the material to initiation of material processing on a tool) via automated detection of material availability, integration of both manual and automated selection for processing, optimal assignment to a process tool and centralized tool job queue control/dispatching.

Figure 4:
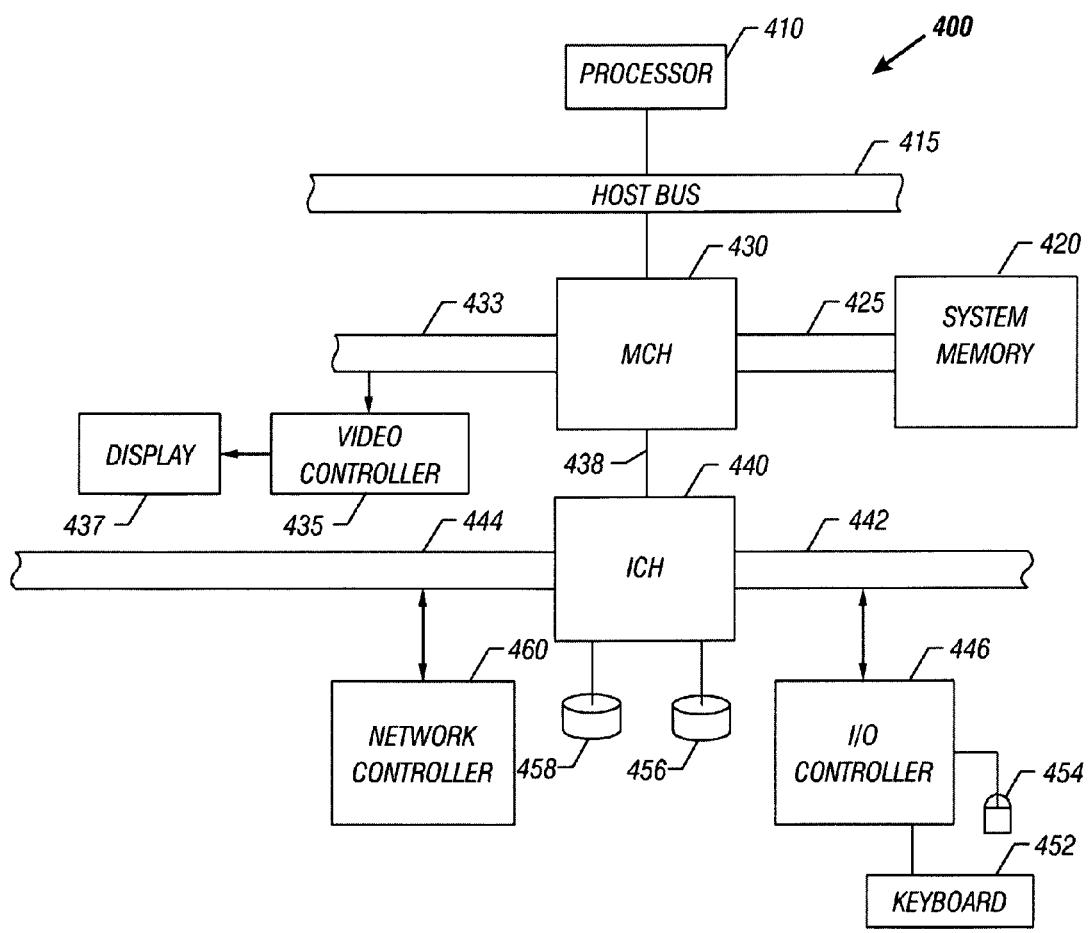
FIG. 4 is a block diagram of a system in which embodiments of the present invention may be used.

FIG. 4 is a block diagram of a computer system 400 that may implement centralized control of a fab in accordance with an embodiment of the invention. As used herein, the term "computer system" may refer to any type of processor-based system, such as a server computer, a blade computer, a desktop computer or the like. In one embodiment, computer system 400 includes a processor 410, which may be a multicore processor. Processor 410 may be coupled over a host bus 415 to a memory controller hub (MCH) 430 in one embodiment, which may be coupled to a system memory 420 (e.g., a dynamic random access memory (DRAM)) via a memory bus 425. Note that during control of a fab by system 400, memory 420 may store a program including various modules such as a QVR module and an assignment manager module, among others. Furthermore, at least portions of the databases used by the centralized system may be present in memory 420 during execution.

MCH 430 may also be coupled over a bus 433 to a video controller 435, which may be coupled to a display 437. MCH 430 may also be coupled (e.g., via a hub link 438) to an input/output (I/O) controller hub (ICH) 440 that is coupled to a first bus 442 and a second bus 444. First bus 442 may be coupled to an I/O controller 446 that controls access to one or more I/O devices. As shown in FIG. 4, these devices may include in one embodiment input devices, such as a keyboard 452 and a mouse 454. ICH 440 may also be coupled to, for example, multiple hard disk drives 456 and 458, as shown in FIG. 4. Such drives may be two drives of a redundant array of individual disks (RAID) subsystem, for example. Note that permanent storage of both control program and databases such as tool databases and lot queue databases may be stored in one or both of disk drives 456 and 458. It is to be understood that other storage media and components may also be included in the system. Second bus 444 may also be coupled to various components including, for example, a network controller 460 that is coupled to a network port (not shown).

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving entries in a database, each entry corresponding to a semiconductor lot to be processed, wherein the entries are received from an automated tool queue loaded by an automated module or from a manual queue loaded by an operator via manual input;
automatically assigning at least some of the entries in the database to one of a plurality of process tools of a semiconductor manufacturing facility using an assignment module;
dynamically dispatching dispatch information regarding the semiconductor lot corresponding to an assigned entry to cause transfer of the semiconductor lot to the corresponding assigned process tool based on status information of the assigned process tool present in a tool database; and
using a watchdog module to periodically detect if any of the entries were not automatically assigned and to trigger an assignment thereof by the assignment module.

2. The method of claim 1, wherein automatically assigning the at least some of the entries comprises assigning the entries according to a predetermined tool assignment policy.

3. The method of claim 1, further comprising:
receiving the status information from the assigned process tool;
storing the status information in the tool database; and
dynamically dispatching the semiconductor lot corresponding to the assigned entry to the assigned process tool, wherein the assigned process tool enters into an idle mode in a time period between transmitting the status information and receiving the semiconductor lot.

4. The method of claim 1, further comprising receiving via the manual input an assignment for at least one of the semiconductor lots.

5. An apparatus comprising:
an assignment module to receive semiconductor lot queue information from an automated scheduler and from a manual input and to store the semiconductor lot queue information in a first database, the assignment module to perform lot-to-tool assignments based on the semiconductor lot queue information in the first database;
a manager module coupled to the assignment module to receive status information from at least one semiconductor tool, wherein the manager module is to instruct an automated handler to transfer a selected lot of a lot-to-tool assignment to a selected semiconductor tool of the lot-to-tool assignment based on the status information; and
a watchdog module to scan one or more storages for semiconductor lot queue information corresponding to at least one unassigned semiconductor lot and to provide the semiconductor lot queue information to the assignment module to trigger an assignment thereof.

6. The apparatus of claim 5, wherein the automated scheduler is to send updated semiconductor lot queue information to the assignment module after completion of processing on the selected semiconductor tool.

7. The apparatus of claim 5, wherein the assignment module is to remain in an automated mode during receipt of the manual input.

8. The apparatus of claim 5, wherein the assignment module is to receive the manual input without switching to a manual mode of operation.

9. An article comprising a computer-readable medium containing instructions that if executed enable a system to:
receive tool status information from a semiconductor processing tool indicative of a request by the semiconductor processing tool for a semiconductor material to be processed in the semiconductor processing tool, wherein the semiconductor processing tool is to enter into an idle mode after transmission of the tool status information;
store the tool status information in an entry of a first database and write a valid availability indicator therein; and
assign the semiconductor material to the semiconductor processing tool based on the valid availability indicator, wherein the semiconductor processing tool is to be restarted after the idle mode without manual restart or re-generation of the request on the restart.

10. The article of claim 9, further comprising instructions that if executed enable the system to store the assignment in a second database.

11. The article of claim 10, further comprising instructions that if executed enable the system to instruct an automated handler mechanism to provide the semiconductor material to the semiconductor processing tool responsive to the assignment in the second database.

12. The article of claim 9, further comprising instructions that if executed enable the system to receive semiconductor material information from an automated component or manual input and to store the semiconductor material information in a shared database.

13. The article of claim 9, further comprising instructions that if executed enable the system to scan the system for at least one unassigned semiconductor material and to assign the at least one unassigned semiconductor material to the semiconductor processing tool based on the valid availability indicator.

* * * * *